C. E. MILLS.
TRANSMISSION GEARING.
APPLICATION FILED MAY 29, 1918.

1,330,740.

Patented Feb. 10, 1920
2 SHEETS—SHEET 1.

Inventor
Claude E. Mills
by Orwig and Baum
Attys

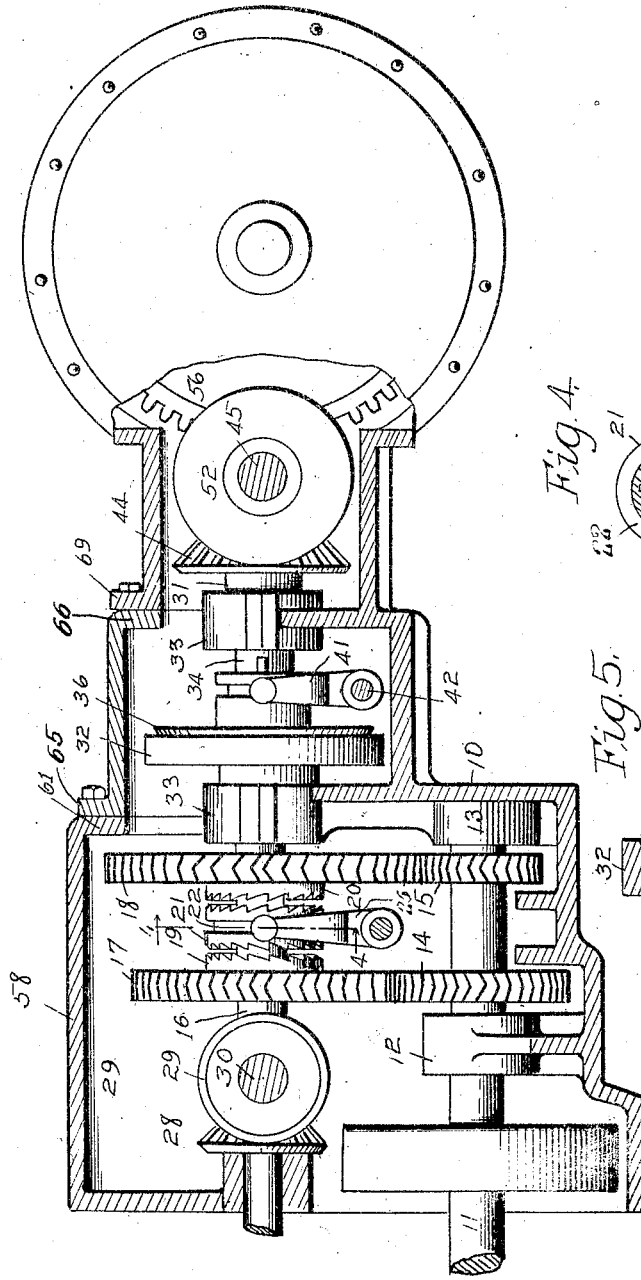

UNITED STATES PATENT OFFICE.

CLAUD E. MILLS, OF DES MOINES, IOWA.

TRANSMISSION-GEARING.

1,330,740.     Specification of Letters Patent.     Patented Feb. 10, 1920.

Application filed May 29, 1918. Serial No. 237,282.

*To all whom it may concern:*

Be it known that I, CLAUD E. MILLS, a citizen of the United States, and resident of Des Moines, in the county of Polk and State of Iowa, have invented a certain new and useful Transmission-Gearing, of which the following is a specification.

The object of my invention is to provide a transmission gearing which is of very strong and durable construction.

A further object of my invention is to provide such a gearing device of very simple construction having a minimum number of parts and amount of material.

A further object is to provide such a transmission device whereby rotation of one shaft may be imparted to other shafts in different directions for running different kinds of machinery.

Still a further object is to provide a suitable casing for such a gearing.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Fig. 3 shows a detail, sectional view taken on the line 3—3 of Fig. 1.

Fig. 4 shows a detail, sectional view taken on the line 4—4 of Fig. 3; and

Fig. 5 shows a vertical, sectional view through the clutch.

Figure 1:
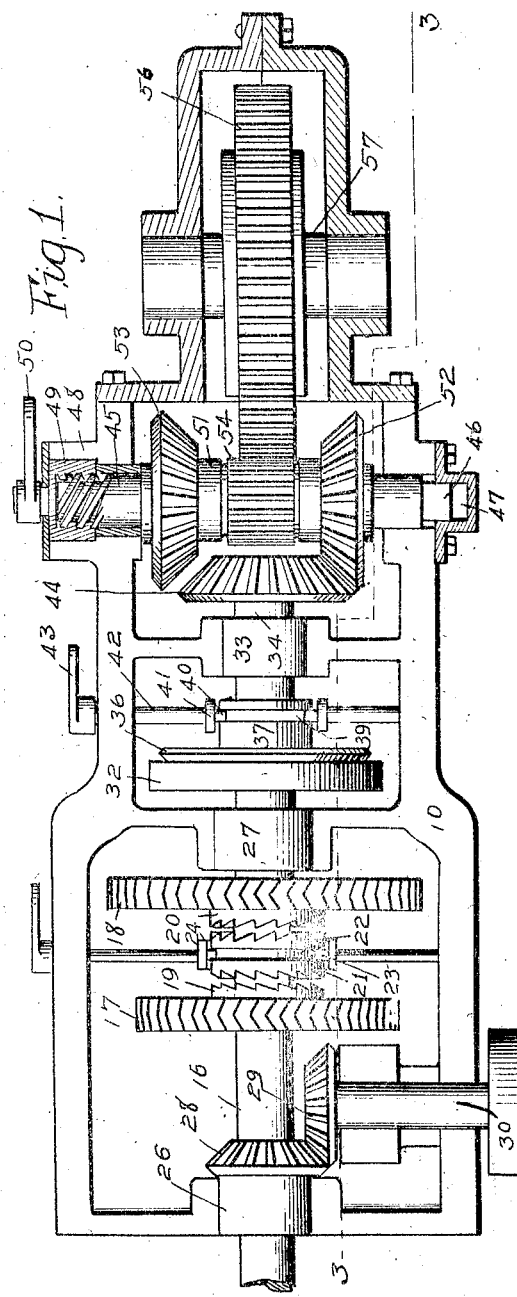
Figure 1 shows a top or plan view of a transmission gearing embodying my invention.
Figure 2:
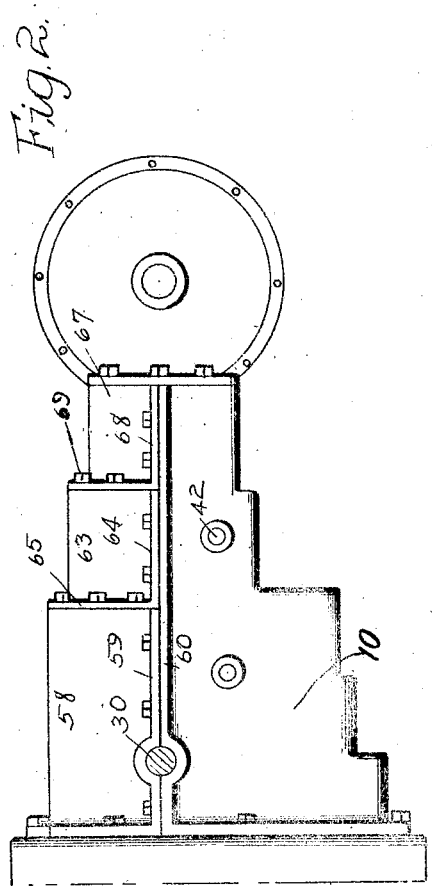
Fig. 2 shows a side elevation of the same inclosed within a gear casing.

In the accompanying drawings I have used the reference numeral 10 to indicate generally the lower part of a gear casing which forms a support and protection for my improved transmission gearing.

Extending into one end of the gear casing 10 near the lower portion thereof is a shaft 11 which may be connected with an engine or other suitable source of power. The shaft 11 is mounted in suitable bearings 12 and 13.

On the shaft 11 are spaced herring-bone gears 14 and 15.

Above the shaft 11 there is extended through the upper portion of one of the gear casings a shaft 16 parallel with the shaft 11.

On the shaft 16 are loosely mounted herring-bone gears 17 and 18, which are meshed with the gears 14 and 15.

Formed on the gears 17 and 18 are clutch members 19 and 20. Slidably but non-rotatably mounted on the shaft 16 between the gears 17 and 18 is a double clutch member 21 having a central groove 22, in which are received pins 23 extending inwardly from the forked arms 24 on a clutch controlling lever 25.

By shifting the double clutch 21 rotation of the shaft 11 may be imparted to the shaft 16 at different speeds.

The gears 17 and 18 are always in mesh with the gears 14 and 15, and I am, therefore, enabled to use the herring-bone gears, which are preferable for the purpose.

The shaft 16 is mounted in suitable bearings 26 and 27 inside of the gear casing.

On the shaft 16 is a beveled gear 28 which meshes with a beveled gear 29, mounted on a shaft 30 which projects through the casing 10, and has on its outer end a suitable gearing device, such as the belt wheel 31, whereby power may be transmitted to various pieces of machinery.

On the opposite end of the shaft 16 from the gear 28 is a cone clutch member 32. Suitably mounted in a bearing 33 is a short shaft 34, one end of which is rotatably received in the end of the shaft 16, as illustrated in Fig. 5.

Fixed on the shaft 34 is a collar 35.

Slidably but non-rotatably mounted on the shaft 34 is a coacting cone clutch member 36 having a hub 37, on the inside of which is a spring 38 which bears against the collar 35, and tends to yieldingly hold the clutch members 36 and 32 in frictional engagement with each other.

The hub 37 is formed with an annular groove 39 which receives the pins 40 on arms 41 mounted on a rock shaft 42, which is operated by a lever 43 for controlling the clutch member 36.

On the opposite end of the shaft 34 from the cone clutch member 36 is a beveled gear 44.

Spaced from the beveled gear 44 is a transverse shaft 45 having a squared end 46 received in an angular socket 47, so that said shaft 45 may slide longitudinally but may not rotate.

Received in the bearing 48 having one end of the shaft 45 is a nut 49, which is controlled by a lever 50. The nut 49 is internally screw-threaded to coact with external screw threads on the shaft 45.

Fixed on the shaft 45 is a sleeve 51 on which are spaced beveled gears 52 and 53, designed to selectively mesh with the gear 44 in different positions of the sleeve 51. On the sleeve 51 is a wide gear 54 which meshes with a gear 56 on a transverse shaft 57.

The parts last described form a reverse gearing mechanism which is more fully described and claimed in my co-pending application Serial Number, 235,632.

In the use of the transmission gearing, herein described, assume that the shaft 11 is the engine shaft or is connected with the engine shaft. It will be seen that the rotation of the shaft 11 imparts rotation to the herring-bone gears 14 and 15 on said shaft. These gears being always in mesh with the gears 17 and 18, respectively, impart continuous rotation to said gears.

When the double clutch member 21 is in neutral position, no motion is transmitted to the shaft 16, but when the clutch member 21 is moved in one direction, as for instance, toward the left in Fig. 3, motion will be imparted from the gear 17 to the clutch member 21, and thence to the shaft 16.

For transmitting motion at a different speed the clutch member 21 can be shifted to position for engaging the clutch member on the gear 18. The shaft 30 is rotated whenever the shaft 16 is rotated, but simply operates as an idler unless the gear 31 is connected with other machinery.

When the shaft 16 is rotated and the clutch members 32 and 36 are in coacting position, rotation is imparted to the shaft 34 and the gear 44 thereon.

The operation of the reverse mechanism is the same as described in my hereinbefore mentioned co-pending application.

It will be noted that the gear 31 may be run at two speeds and that the gear 56 may be run at two speeds in either direction.

I consider one of the important features of my invention, the arrangement of the gear casing parts. The left portion of the gear casing member 10 has a top or cover member 58 provided with side flanges 59 resting against corresponding side flanges 60 on the gear casing 10, and designed to be secured thereto by bolts or the like.

The gear casing cover 58 has at its right-hand end a flange 61.

Above the central portion of the gear casing member 10, which receives the clutch members 32 and 36, is a second top or cover member 63 having flanges 64 similar in arrangement to the flanges 59 for coacting with the flange 60, and having at its left-hand end a flange 65 adapted to be bolted to the flange 61, and at its right-hand end an inturned flange 66.

Adjacent to the cover 63 is another gear cover member 67 having a flange 68 coacting with the flange 60, and a flange 69 coacting with the flange 66.

It will be seen that these various gear cover members may be very quickly and easily removed for having access to different parts of the operative mechanism.

The lower gear casing member forms a support for the various shafts, and the gear casing members are so arranged that the operative parts may be run in oil to reduce the wear to a minimum.

I claim:

In a device of the class described, a gear casing member, a shaft extended into one end of said gear casing member, a pair of spaced gears thereon, a second shaft received within said gear casing member, parallel with said first shaft, a pair of gears loosely mounted on the second shaft in mesh with gears on the first shaft, said second pair of gears having clutch members thereon, a double clutch member slidably but non-rotatably mounted on said second shaft between said first described clutch members, a third shaft operatively connected with said second shaft having a gearing device thereon, a fourth shaft alined with said second shaft and said gear casing member, coacting clutch devices on said second and fourth shafts, whereby rotation may be imparted from the second to the fourth shaft, a beveled gear on said fourth shaft, and a reverse gearing mechanism operatively connected with said last gear.

Des Moines, Iowa, May 10, 1918.

CLAUD E. MILLS.